June 14, 1932.    A. J. ENGLUND    1,862,531
SAW GAUGE
Filed Feb. 24, 1930    2 Sheets-Sheet 1

INVENTOR:
A. J. Englund
BY H. J. Sanders
ATTORNEY

June 14, 1932.  A. J. ENGLUND  1,862,531
SAW GAUGE
Filed Feb. 24, 1930  2 Sheets-Sheet 2

INVENTOR:
A. J. Englund
BY H. J. Sanders
ATTORNEY

Patented June 14, 1932

1,862,531

UNITED STATES PATENT OFFICE

ANDERS JOHAN ENGLUND, OF MILNER, BRITISH COLUMBIA, CANADA

SAW GAUGE

Application filed February 24, 1930. Serial No. 430,724.

This invention relates to improvements in saw gauges and its object is to provide an instrument for gauging or measuring the relative length of raker teeth as compared to the other teeth of log or cross cut saws and for gauging the set or lateral angularity of the teeth.

With the foregoing and other objects in view the invention consists in the combination and arrangement of parts to be hereinafter fully described, pointed out in the claims and illustrated in the accompanying drawings which form a part of this application for patent and in which—

Like reference characters denote corresponding parts throughout the several views.

Figure 1:
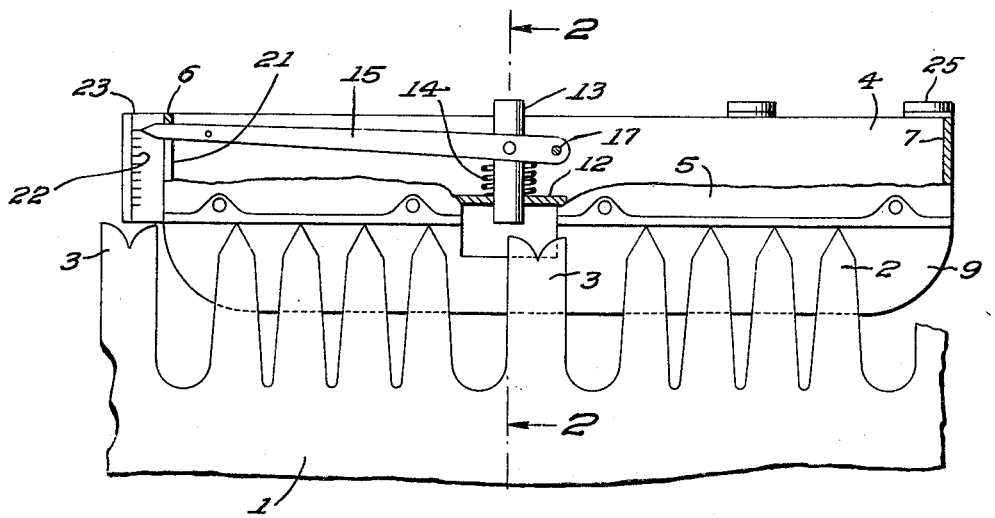
Fig. 1 is a view of the saw in side elevation and partly in section illustrating its application to a saw.
Figures 2, 3:
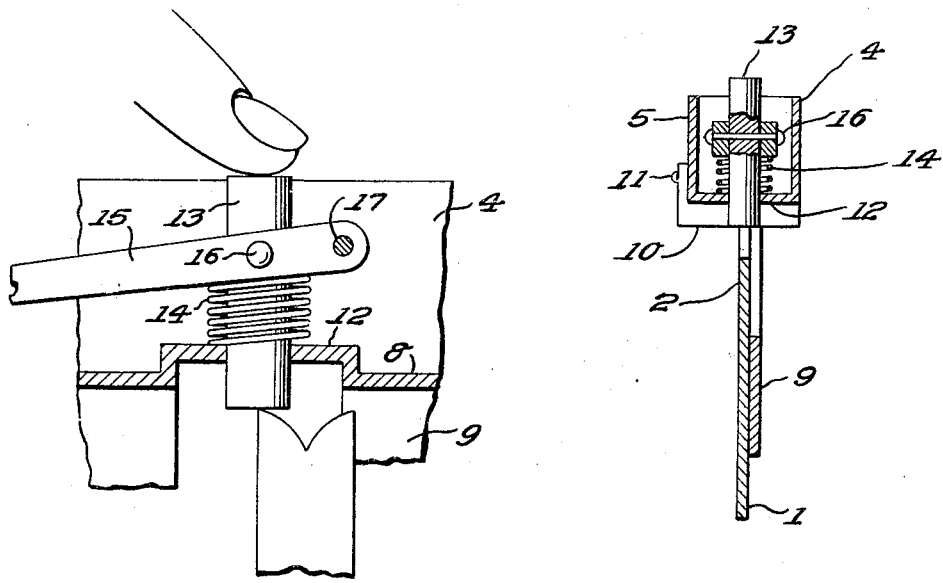
Fig. 2 is a vertical sectional view, slightly enlarged, on the line 2—2 of Fig. 1.
Fig. 3 is an enlarged fragmentary sectional view showing the method of applying the gauge plunger to a raker tooth.

In order to maintain log and cross cut saws at maximum efficiency so that they will cut rapidly and easily it is necessary to keep the teeth in very good shape, the set of the cutter teeth and the length of the raker teeth being properly maintained and this requires corrections or adjustments of inaccuracies to approximately the one-thousandth part of an inch.

It is the purpose of the present invention to provide a device that will readily and instantly detect such inaccuracies and indicate them on an enlarged scale where they can be clearly observed.

The gauge comprises a frame for application to the saw blade teeth and a plunger supported in the frame for contact with any of the raker teeth, the plunger operatively engaging an indicator that travels over a scale graduated in fractions of an inch, the scale being disposed at one end of the frame with its graduations clearly legible as the particular measurement is taken.

The reference numeral 1 denotes a saw blade having the cutter teeth 2 and raker teeth 3. An elongated trough like frame having the side walls 4, 5, end walls 6, 7 and the floor 8 is provided, said frame having secured thereto the contact web comprising the straight edge 9, depending from the floor 8, and the angular portion 10 that is secured to the floor and to one side wall 5 by fastening means 11, said web being coextensive with the frame.

The floor 8 and side walls are formed with the offset portion 12, perforated to receive the plunger 13 encompassed by the coil spring 14, one end of which rests upon the offset 12 and the other abutting the indicator 15 that is pivotally connected by the pin 16 to the plunger, said indicator at one end being fulcrumed upon the pin 17, connecting the side walls 4, 5. The free or non-fulcrumed end of the indicator is bifurcated to form the forks 18, 19 connected by the link 20, said forks extending out from the frame through slots 21 in the wall 6 and the pointed ends thereof being adapted to register with the graduations 22, in fractions of an inch, of the scale 23 secured to the end wall 16 of the frame and extending outwardly therefrom.

The upper ends of the slots 21 in said wall serve as stops for the forks 18, 19 of the indicator which members are yieldingly retained in contact with said slot ends by the said spring 14, the topmost graduation of the scale being then indicated by the fork ends of the indicator.

The straight edge portion 9 of the contact web is recessed in alignment with the recess in the frame caused by the offset 12 thereby providing a clearance opening for the user's or operator's finger inserted therethrough to depress the plunger 13. A lug 24 connects the walls 4, 5, 7 of the frame at one end and carries a foot 25 and spaced from said lug 24 is a bridge bar 26 that extends transversely of and beyond the walls 4, 5 and that is secured thereto, said bar 26 being provided at its ends with the feet 27, 28, said feet 25, 27, 28 serving as contact points for the saw blade 1 while the set of a tooth is being ascertained by the use of the plunger.

In Fig. 1 the gauge is being used to measure the height of a raker tooth 3 relative to the cutting teeth. The gauge is applied to the saw blade with the floor 8 resting upon the ends of certain of the cutting teeth and the raker tooth 3 to be measured being disposed beneath the plunger. The plunger is now depressed, thus compressing the spring 14, until it contacts with a point of the raker tooth. This movement of the plunger will cause the indicator to move downward slightly. This movement will change the reading of the bifurcated end of the indicator with relation to the scale. A certain graduation upon the scale, downward from the top graduation, will denote the proper resting point of the ends of the indicator if the raker tooth is of precisely the proper length relative to the cutting teeth. Any deviation from this proper registration will reveal at once the inaccuracy of the raker tooth so that it can be filed properly.

Figures 4, 5:
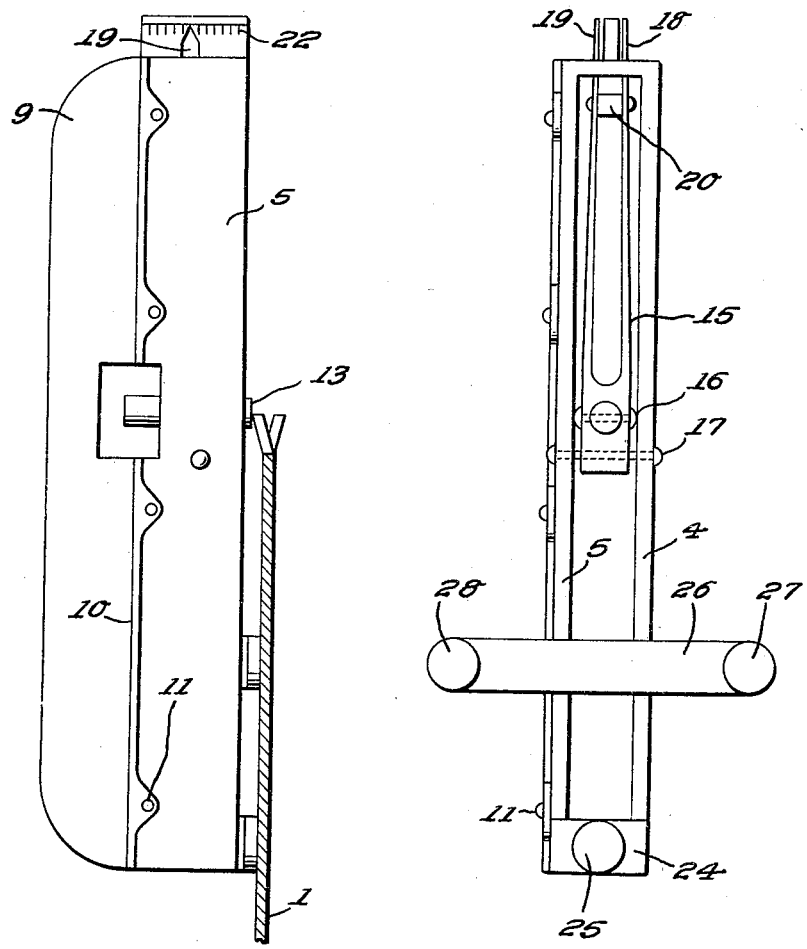
Fig. 4 is a side view similar to Fig. 1 but reversed and pitched at an angle with respect thereto, illustrating the application of the gauge used as a saw set.
Fig. 5 is a top plan view of Fig. 1, the saw blade being omitted.
Figure 6:
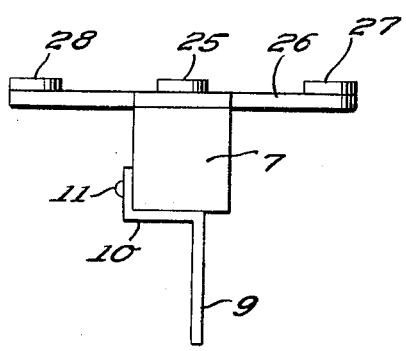
Fig. 6 is a view of Fig. 5, in end elevation.

In measuring the set or lateral angularity of any tooth the feet 25, 27, 28 are applied to the saw blade when the plunger is directly opposite the particular tooth. Pressure upon the plunger until it contacts with the tooth will cause a reading of the indicator upon the scale again which, in a manner similar to that explained, will indicate the correctness or incorrectness of the set of the tooth in question. This application is illustrated in Fig. 4.

What is claimed is:—

1. In a saw gauge, an elongated frame comprising a floor formed with an offset portion, a scale carried by said frame, a web carried by and depending from said frame and being recessed in alignment with the offset portion of said frame, an indicator fulcrumed to said frame and extending outwardly through one end thereof for registration with said scale, a plunger arranged in said frame and extending out through the offset portion thereof, and a pin pivotally connecting said plunger and indicator together, said plunger yieldingly retaining said indicator in a predetermined position relative to said scale.

2. In a saw gauge, an elongated frame comprising a floor formed with an offset portion, a scale carried by said frame, a web carried by and depending from said frame and being recessed in alignment with the offset portion of said frame, an indicator fulcrumed to said frame and extending outwardly through one end thereof for registration with said scale, a plunger arranged in the offset portion of said frame, a pin connecting said plunger and indicator, and a spring encircling said plunger and frame and contacting with said indicator.

In testimony that I claim the foregoing as my own I have hereto affixed my signature.

ANDERS JOHAN ENGLUND.